United States Patent
Nomoto et al.

[11] Patent Number: 5,432,885
[45] Date of Patent: Jul. 11, 1995

[54] RECURRENT FUZZY INFERENCE APPARATUS

[75] Inventors: Kohei Nomoto; Michimasa Kondo, both of Kanagawa, Japan

[73] Assignee: Mitsubishi Denki Kabushiki Kaisha, Tokyo, Japan

[21] Appl. No.: 950,166

[22] Filed: Sep. 24, 1992

Related U.S. Application Data

[63] Continuation-in-part of Ser. No. 232,668, Aug. 16, 1988, abandoned.

[30] Foreign Application Priority Data

| Oct. 16, 1987 | [JP] | Japan | 62-262031 |
| Oct. 16, 1987 | [JP] | Japan | 62-262032 |
| Oct. 16, 1987 | [JP] | Japan | 62-262033 |
| Oct. 16, 1987 | [JP] | Japan | 62-262034 |

[51] Int. Cl.⁶ .................. G06F 9/44; G06F 15/46
[52] U.S. Cl. ............................ 395/3; 395/61; 395/900; 395/906
[58] Field of Search .......... 395/3, 51, 61, 900, 395/906; 364/148, 160, 161, 162, 163, 165

[56] References Cited

U.S. PATENT DOCUMENTS

| 4,837,725 | 6/1989 | Yamakawa | 364/807 |
| 4,864,490 | 9/1989 | Nomoto et al. | 364/157 |
| 4,875,184 | 10/1989 | Yamakawa | 364/807 |
| 5,025,499 | 6/1991 | Inoue et al. | 364/165 |
| 5,043,862 | 8/1991 | Takahashi et al. | 364/162 |
| 5,251,288 | 10/1993 | Nomura et al. | 395/51 |
| 5,272,621 | 12/1993 | Aoki | 364/165 |
| 5,280,565 | 1/1994 | Nomoto et al. | 395/51 |

OTHER PUBLICATIONS

Procyk et al., "A Linguistic Self-Organizing Process Controller," Automatica, vol. 15, 1979, 15-30.
van Nauta Lemke et al., "Fuzzy PID Supervisor," 24th Conf. on Decision & Control, Dec. 1985, 602-608.

*Primary Examiner*—Robert W. Downs
*Attorney, Agent, or Firm*—Rothwell, Figg, Ernst & Kurz

[57] ABSTRACT

A fuzzy inference apparatus in which a new membership function is synthesized from a current, weighted membership function and a previously synthesized membership function fed back from a previous operation and in which a new inference value is derived from the newly-synthesized membership function. The apparatus also includes, in one embodiment, weighting apparatus for weighting the previously synthesized membership function according to the degree of response of a selected process characteristic of the process in relation to the previously synthesized membership function.

7 Claims, 12 Drawing Sheets

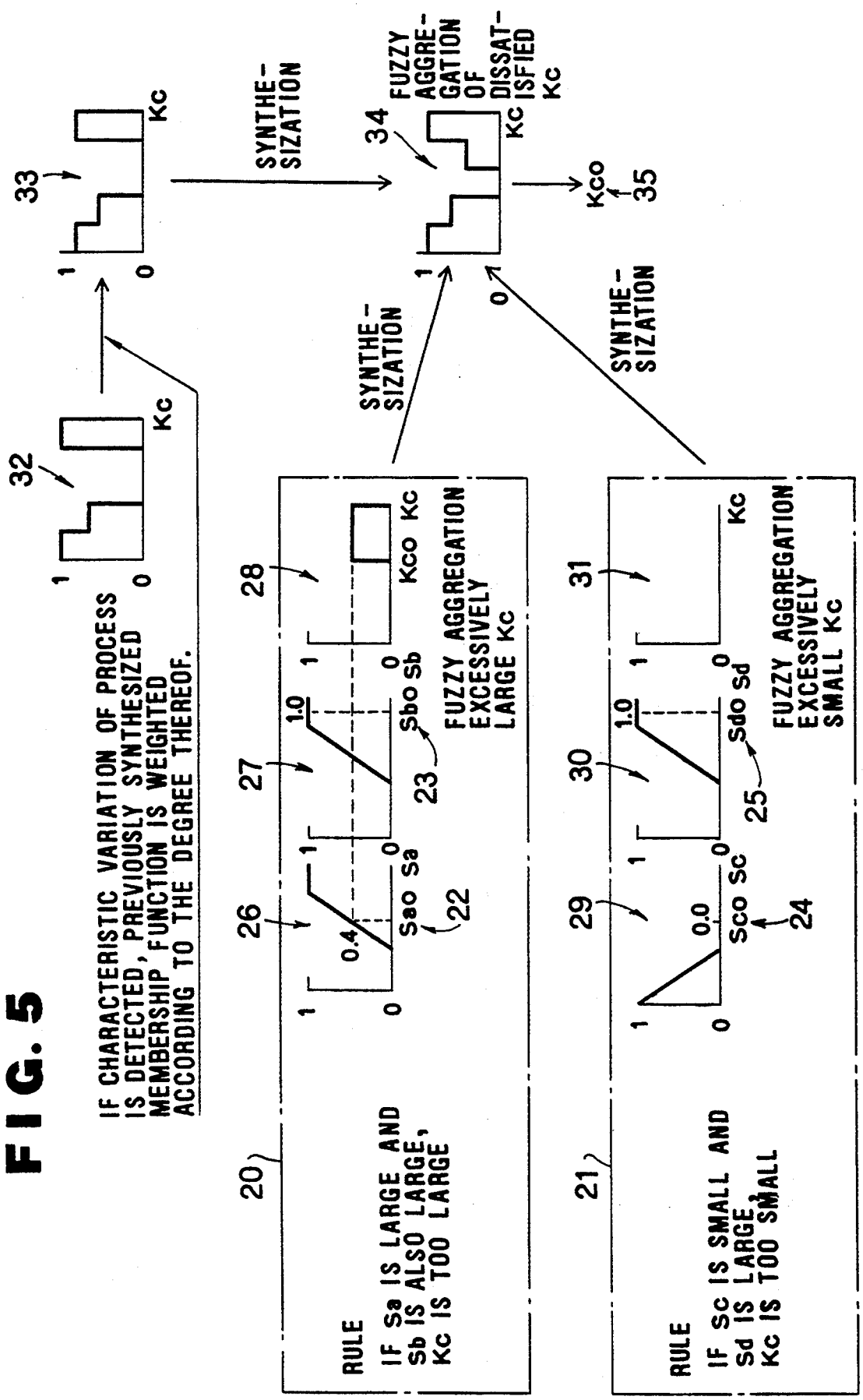

RECURRENT FUZZY INFERENCE APPARATUS

CROSS REFERENCE TO RELATED APPLICATION

This application is a continuation-in-part of application Ser. No. 07/232,668, filed Aug. 16, 1988, now abandoned.

BACKGROUND OF THE INVENTION

1. Field of the Invention

This invention relates to a recurrent type fuzzy inference apparatus which monitors various industrial processes to infer a value of parameter suitable for the industrial process.

2. Prior Art

FIG. 1 is an explanatory view showing the operating principle of a conventional fuzzy inference apparatus, for example, shown in "Fuzzy System Theory and Fuzzy Control" appearing on pages 61 to 66 of "Labor Saving and Automation", November 1986 (by Kiyoji Asai). In FIG. 1, reference numerals 1 and 2 designate inference rules, and 3 and 4 designate characteristic variables to be inputted in the fuzzy inference apparatus, which are respectively the control error e and the rate of change Ue of the control error in the control system. Reference numerals 5 and 6 are membership functions of the first half of the rule 1, 7 the membership function of the second half of the rule 1, 8 and 9 the membership functions of the first half of the rule 2, and 10 the membership function of the latter half of the rule 2. Further, numeral 11 designates the membership function obtained by synthesizing the membership functions 7 and 10, and 12 the inference value obtained by taking the center of gravity out of the membership function 11, and in this example, it is outputted as a manipulated variable Uu from the fuzzy inference apparatus.

FIG. 2 is a block diagram showing one example of a conventional fuzzy inference apparatus on the basis of the operating principle as mentioned above. In FIG. 2, reference numeral 13 designates the weighting unit constituting means which evaluates the degree of matching of the first half from the inputted characteristic variables 3 and 4 with respect to the rules 1 and 2 to weight the membership function of the second half on the basis of the degree of matching, 14 the synthesizing unit constituting means for synthesizing the membership functions weighted by the weighting unit 13, and 15 the inference value deciding unit constituting means for deciding an inference value 12 from the membership function synthesized by the synthesizing unit 14 to output the same.

The operation will be described hereinafter. The rule 1 herein refers to the following: "If the characteristic variable 3 (control error e) is slightly deviated negatively and the characteristic variable 4 (the rate of change Ue of the control error) is slightly deviated positively, then make the inference value 12 (manipulated variable Uu) slightly deviated positively". A portion of the above stated rule "If . . . " is called the aforementioned first half, and a later portion is called the aforementioned second half. Accordingly, the membership function 5 of the first half of the rule 1 defines "aggregation of the control error slightly deviated negatively", and the membership function 6 defines "aggregation of the rate of change of the control error slightly deviated negatively", and the membership function 6 defines "aggregation of the rate of change of the control error slightly deviated positively".

Assume now that the actual value of the control error as the characteristic variable 3 inputted into the weighting means 13 is eo and the actual value of the rate of change of the control error as the characteristic variable 4 is $Ue_o$, the degree that the value $e_o$ is "the control error slightly deviated negatively" is evaluated as "0.8" by the membership function 5, and the degree that the value $Ue_o$ is "the rate of change of the control error slightly deviated positively" is evaluated as "0.7" by the membership function 6. Out of these evaluated values, the lower value "0.7" is employed to constitute the degree of matching of the first half of the rule 1. The membership function 7 of the second half of the rule 1 has a meaning that "make the manipulated variable slightly deviated positively", the membership function 7 being weighted 0.7 times in accordance with the value of the degree of matching of the first half.

This is totally true for the rule 2. That is, the degree of matching of the first half is evaluated on the basis of the actual value $e_o$ of the control error of the inputted characteristic variable 3 and the actual value $Ue_o$ of the rate of change of the control error of the characteristic variable 4, and the membership function 10 is weighted 0.5 times on the basis of the value "0.5" of the degree of matching. The thus weighted membership functions 7 and 10 are inputted into and synthesized by the synthesizing means 14 to obtain the synthesized membership function 11. Furthermore, the synthesized membership function 11 is inputted into the inference value deciding means 15 for calculation of the center of gravity, as a consequence of which the manipulated variable $Uu_o$ is outputted as the inference value 12 from the fuzzy inference apparatus.

As described above, in the fuzzy inference apparatus, a plurality of rules simultaneously function whereby the weighting of the second half corresponding to the degree of matching of the first half is effected and the value balanced as a whole is outputted as the inference value.

Since the conventional fuzzy inference apparatus is constructed as described above, in the case where the characteristic variable (Si) which is the input of the fuzzy inference apparatus is normally Si=0 but only when a certain phenomenon occurs, $0 < Si \leq 1$, the inference is impossible for the normal case where Si=0. And there further involves a problem in that even if the inference could be made, the inference value would not be a continuous value and in addition, if a parameter to be inferred is constant or merely changed slowly so that its rate of change is near zero, it is not possible to obtain a convergent inference value.

SUMMARY OF THE INVENTION

The present invention has been accomplished in order to overcome these problems as noted above with respect to prior art. It is an object of the present invention to provide a fuzzy inference apparatus in which, even for the case where the characteristic variable is normally often "0", the inference can be made, and in which the inference value can be a continuous value, and in which even when a parameter to be inferred is constant or merely changed slowly, a convergent inference value can be obtained.

It is a further object of the present invention to provide a fuzzy inference apparatus in which in the synthesizing membership functions include not only the membership function of the second half of each of rules but also the previously synthesized membership function, and are synthesized at the same time.

It is another object of the present invention to provide a fuzzy inference apparatus in which in the synthesizing of the membership functions includes not only the membership function of the second half of each of rules but also the previous synthesized membership function, the same being weighted according to the degree of the change in characteristic of the process and being synthesized at the same time so as to describe a satisfaction of each inference value on each of the rules.

Other objects and advantages of the present invention will be apparent from the ensuing detailed description of the embodiments made while referring to the accompanying drawings.

BRIEF DESCRIPTION OF THE DRAWINGS

FIG. 5 is an explanatory view showing the operating principle of the same;

PREFERRED EMBODIMENTS OF THE INVENTION

Figure 1:
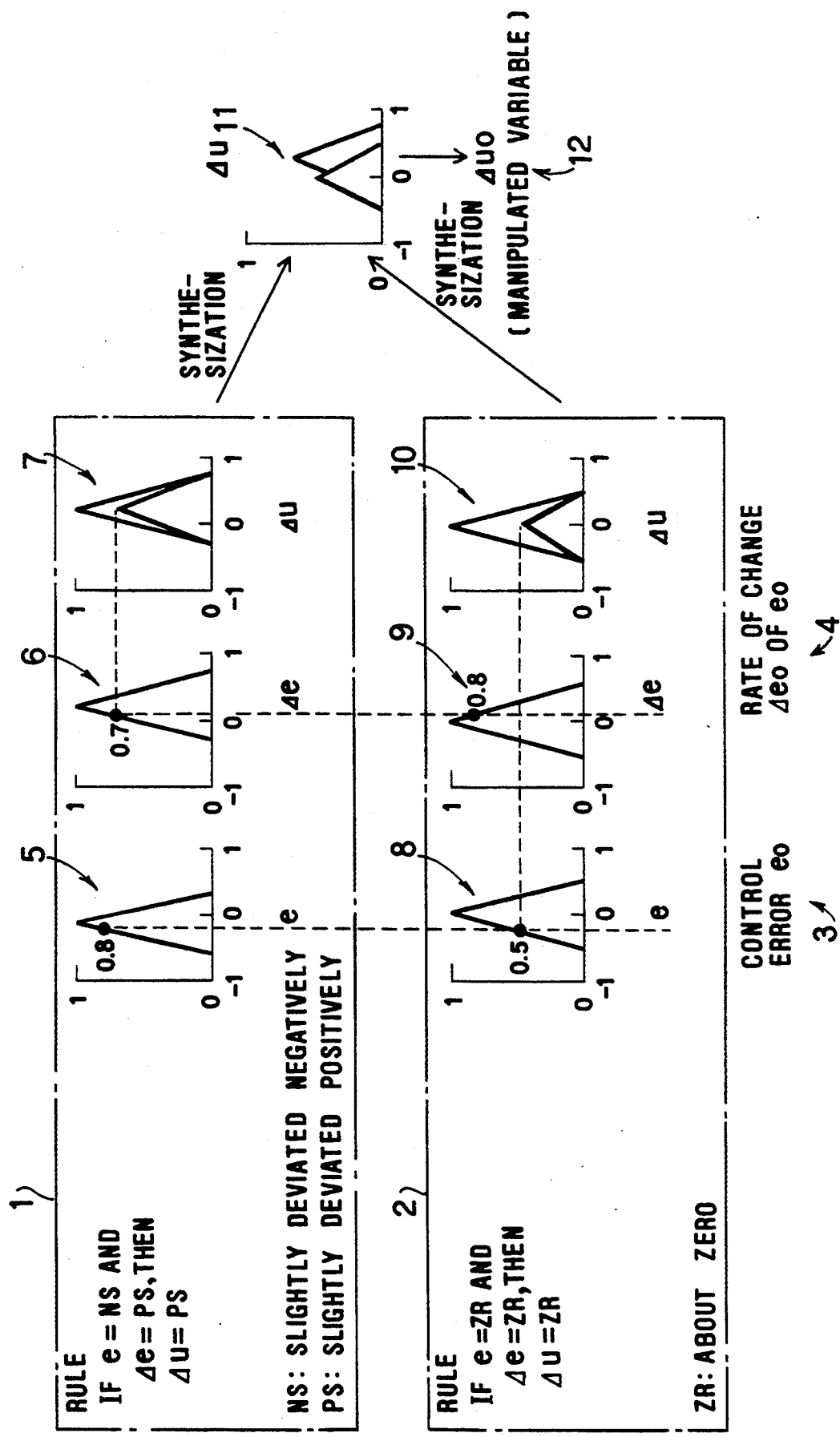
FIG. 1 is an explanatory view showing the operating principle of a conventional fuzzy inference apparatus.
Figure 2:
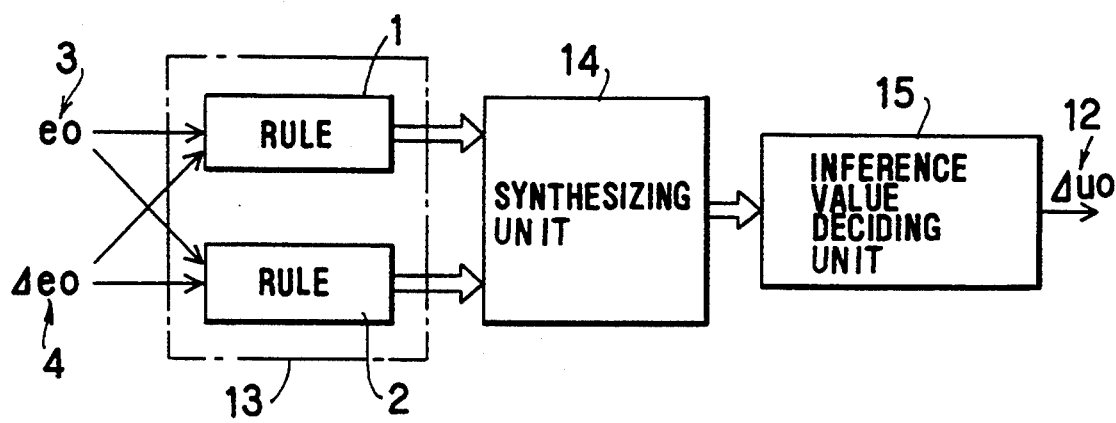
FIG. 2 is a block diagram showing the apparatus of FIG. 1.
Figure 4:
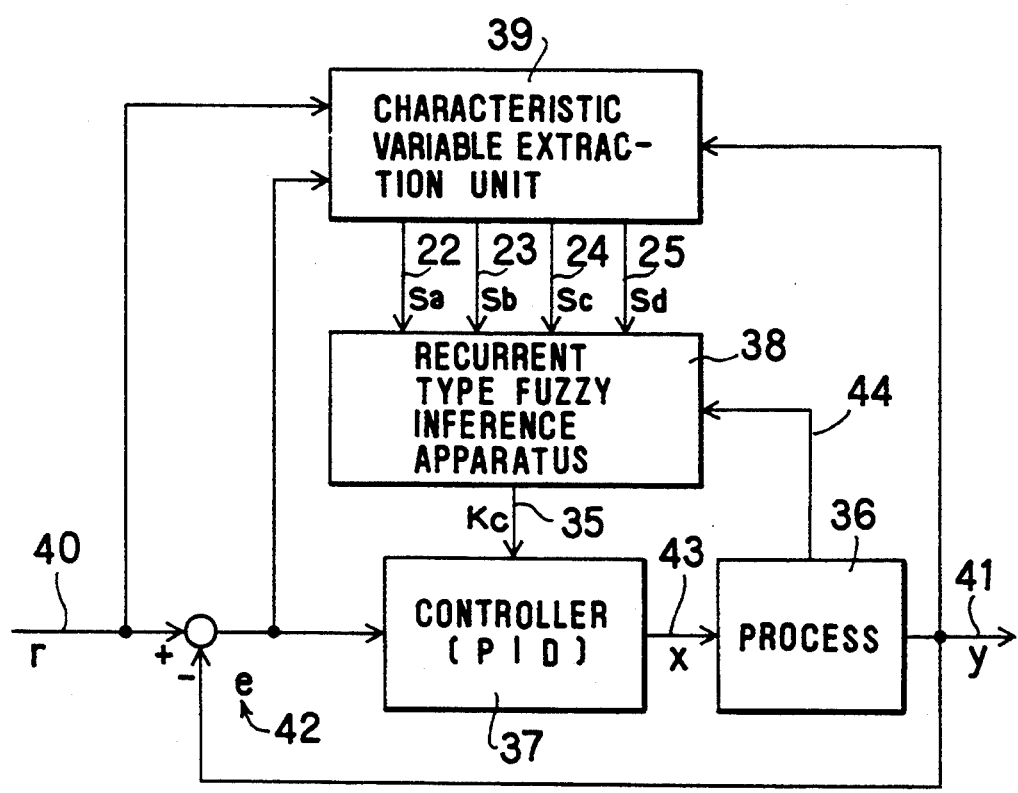
FIG. 4 is a block diagram showing an example in which a controller for controlling the process is applied to a tuning of a control gain.
Figure 3:
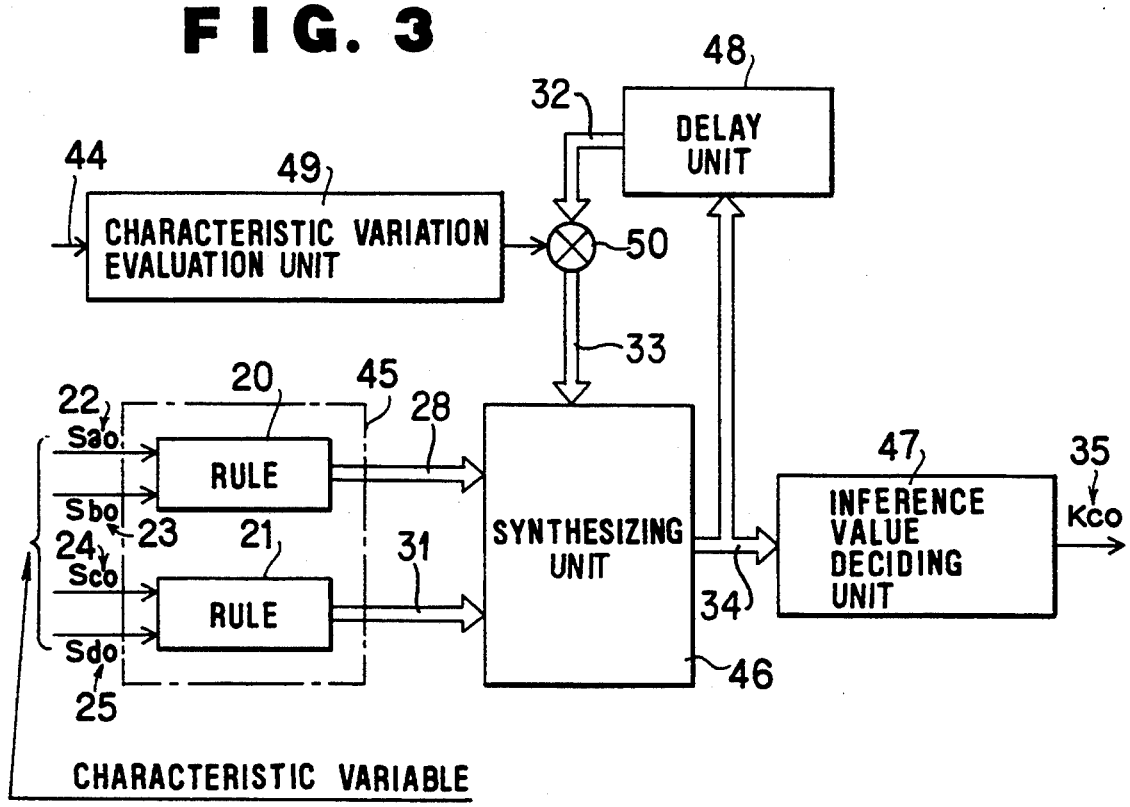
FIG. 3 is a block diagram showing one embodiment of a recurrent type fuzzy inference apparatus according to one embodiment of the present invention.

In the following, one embodiment of the present invention will be described with reference to the drawings. FIG. 3 is a block diagram showing one embodiment of a recurrent type fuzzy inference apparatus according to the present invention; FIG. 4 is a block diagram in which a controller for controlling the process is applied to a tuning of a control gain; and FIG. 5 is an explanatory view showing the operating principle of the same. In these drawings, reference numerals 20 and 21 designate inference rules, 22 to 25 characteristic variables to be inputted in the recurrent type fuzzy inference apparatus, 26 and 27 membership functions of the first half of the rule 20, 28 a membership function of the second half thereof, 29 and 30 membership functions of the first half of the rule 21, and 31 a membership function of the second half thereof. Reference numeral 32 designates a synthesized membership function indicative of a dissatisfaction of the previous synthesization, 33 a synthesized membership function with said previous synthesized membership function 32 indicative of dissatisfaction weighted according to the characteristic change of the process, 34 a synthesized membership function obtained by synthesizing the membership function 28 of the second half of the rule 20 and the membership function 31 of the second half of the rule 21 and the weighted previous membership function 33, which represents the fuzzy aggregation of "dissatisfied control gain Kc", and 35 an inference value obtained from the synthesized membership function 34, which in this example, is outputted as the control gain Kc from the recurrent type fuzzy inference apparatus.

Further, reference numeral 36 designates a process to be controlled, 37 a controller, for example, such as a PID controller, 38 a recurrent type fuzzy inference apparatus in accordance with the present invention which supplies the inference value (control gain Kc) to the controller 37, 39 a characteristic variable extraction unit for supplying characteristic variables 22 to 25 to the fuzzy inference apparatus 38, 40 a reference input (r) applied from the outside of a control system, 41 a controlled variable (y) outputted from the process 36, 42 a control error (e), which is inputted into the controller 37, between the reference input 40 and the controlled variable 41, 43 a manipulated variable (x) applied to the process 36, and 44 a process characteristic variation amount sent from the process 36 to the fuzzy inference apparatus 38.

Furthermore, reference numeral 45 designates a weighting unit constituting means which evaluates the degree of matching of the first half from the characteristic variables 22 to 25 inputted into the rules 20 and 21 to weight the membership function of the second half on the basis of the degree of matching 46 a synthesizing unit constituting means for synthesizing the membership functions 28, 31 weighted by the weighting means 45 and the previous synthesized membership function 33 to obtain a new synthesized membership function 34 indicative of the degree of dissatisfaction of the inference value 35, 47 an inference value deciding unit constituting means for deciding the inference value 35 from the previous synthesized membership function 33 synthesized by the synthesizing unit constituting means 46 to output the same, 48 a delay means for delaying a new synthesized membership function 32 synthesized by the synthesizing means 46, 49 a characteristic-variation evaluation unit constituting means for evaluating the degree of variation in characteristic of the process on the basis of the process characteristic variation amount 44 inputted from the process 36, and 50 a multiplying unit constituting means forming an evaluation and weighting means together with the characteristic variation evaluation means 49 to multiply the synthesized membership function 32 delayed by the delay means 48 by the evaluated value from the characteristic variation evaluation means 49 to effect weighting of the delayed function 32 and to feed it back as the synthesized membership function 33 to the synthesizing means 46.

The complete block diagram of the preferred embodiment to be described is illustrated in FIG. 4. The characteristic variables 22, 23, 24 and 25 are those process variables which are to be monitored for the purpose of controlling the gain control signal Kc of the controller 37. The recurrent type fuzzy inference apparatus 38 of the embodiment of FIG. 4 is shown in FIG. 3.

The fuzzy inference apparatus 38, as illustrated in detail in FIG. 3, accepts as inputs the variables 22, 23, 24 and 25 and outputs the gain control signal 35, illustrated as $Kc_o$ in FIG. 3.

The controller 37 may itself be any well known type of process controller, such as a PID controller, for example, the gain of which is controlled by the gain signal Kc. For example, the controller 37 may be a Mitsubishi microprocessor based one-loop controller such as one sold by Mitsubishi under the model name MACTUS 210 series.

The operation will now be described with reference to FIGS. 3, 4 and 5. The object of the inference in the recurrent type fuzzy inference apparatus is to monitor the characteristic variables 22 to 25 of the process to effect tuning of the control gain Kc. So, first, the characteristic variables 22 to 25 are specifically shown. That is, the characteristic variable 22 is the divergent trend of the error (e) 42, the characteristic variable 23 the magnitude Sb of the error 42, the characteristic variable 24 the following degree of the controlled variable (y) with respect to the variation of the reference input (r) 40, and the characteristic variable 25 the magnitude Sd(=Sb) of the error 42. At this time, the rule 20 has a meaning that "If the divergent trend of the error (e) 42 is large, and the absolute value thereof is also large, the present control gain Kc can be judged to be too large". Where the actual values of the characteristic variables 22 to 25 inputted into the weighting means 45 are $Sa_o$, $Sb_o$, $Sc_o$ and $Sd_o$, whether or not the value $Sa_o$ is "large" and whether or not the value $Sb_o$ is "large", in the rule 20, are respectively evaluated by the membership functions 26 and 27 of the first half of the rule 20. In the example shown in FIG. 5, the respective evaluated values, the lower value "0.4" is employed as the degree of matching of the first half of the rule 20.

Further, the second half of the rule 20 defines the fuzzy aggregation of "excessively large control gain Kc", and the control gain $Kc \geq Kc_o$ above the present control gain $Kc_o$ is said to be "excessively large" in the degree of the degree of matching "0.4" of at least the first half. Then, weighting corresponding to the degree of matching "0.4" of the first half is effected to prepare a membership function 28. This is totally true for the rule 21, and a membership function 31 of the second half is prepared on the basis of the degree of matching whereby the actual values $Sc_o$ and $Sd_o$ of the inputted characteristic variables 24 and 25 are evaluated by the membership functions 29 and 30. In this example, the membership function 31 is the function all of whose values are "0".

Figure 6:
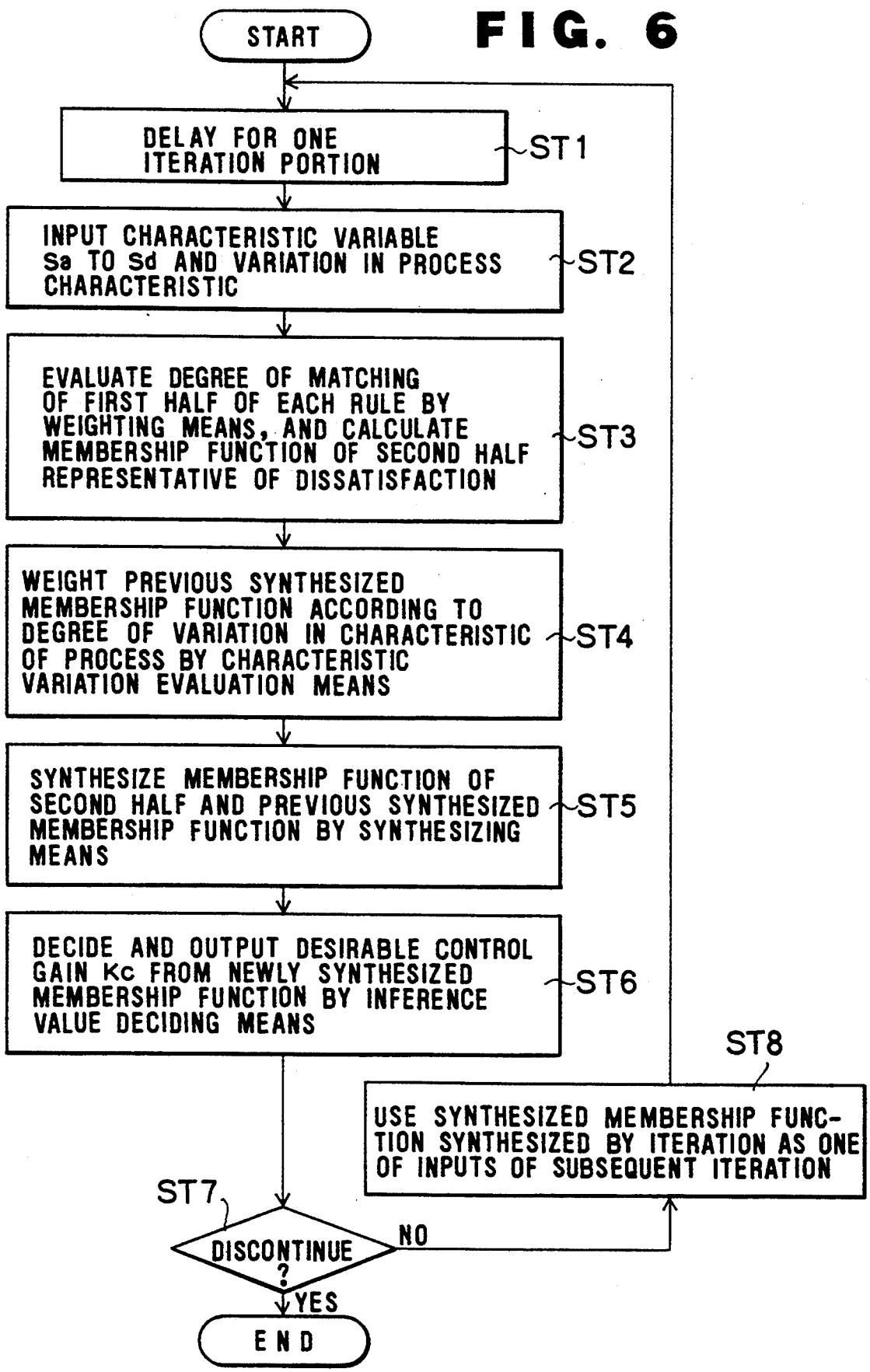
FIG. 6 is a flow chart showing a flow of the operation.

FIG. 6 is a flow chart showing the flow of the operation. The synthesized membership function 32, which was synthesized by the synthesizing means 46 in the previous iteration and sent as an input of the subsequent iteration (Step ST 8), is given a delay of one iteration portion (Step ST 1). Separately from this, the characteristic variables are inputted into the weighting means 45, and the process characteristic variation amount 44 from the process 36 is inputted into the characteristic variation evaluation means 49 (Step ST 2). The weighting means 45 prepares the membership functions 28 and 31 of the second half by evaluating the inputted characteristic variables 22 to 25 by the membership functions 26, 27 and 29, 30 of the first half of the rules 20 and 21 and on the basis of the obtained degree of matching (Step ST 3). The characteristic variation evaluation means 49 evaluates the degree of variation in characteristic of the process from the inputted process characteristic variation amount 44 and sends its evaluated value to the multiplying means 50. This evaluated value is multiplied by the previous synthesized membership function 32 delayed by the delay means 48 for weighting to obtain the weighted synthesized membership function 33 (Step ST 4).

The membership functions 28 and 31 of the second half of the rules 20 and 21 and the thus weighted and synthesized membership function 33 are inputted into and synthesized by the synthesizing means 46 to produce a new synthesized membership function 34 (Step ST 5). For this synthesizing operation, arithmetic operation for the union is used. Accordingly, the synthesized membership function 34 is the sum aggregation of the fuzzy aggregation of "excessively large control gain Kc" and fuzzy aggregation of "excessively small control gain Kc", and therefore, after all, can be understood to be the fuzzy aggregation of "unsatisfied control gain Kc". The synthesized membership function 34 is inputted into the inference value deciding means 47, which in turn decides a control gain $Kc_o$ as the inference value 35 on the basis thereof and then is outputted to the controller 37 from the recurrent type fuzzy inference apparatus 38 (Step ST 6). More specifically, a control gain wherein the value of the synthesized membership function 34 is the smallest may be selected. Next, judgment for discontinuing the operation is effected (Step ST 7). When the operation is desired to be continued, the processing is returned to the Step ST 8 where the synthesized membership function obtained at the Step ST 5 is used as an input of the subsequent iteration.

Another embodiment of this invention will be described hereinafter with reference to FIGS. 3, 4, 7 and 8.

Figure 7:
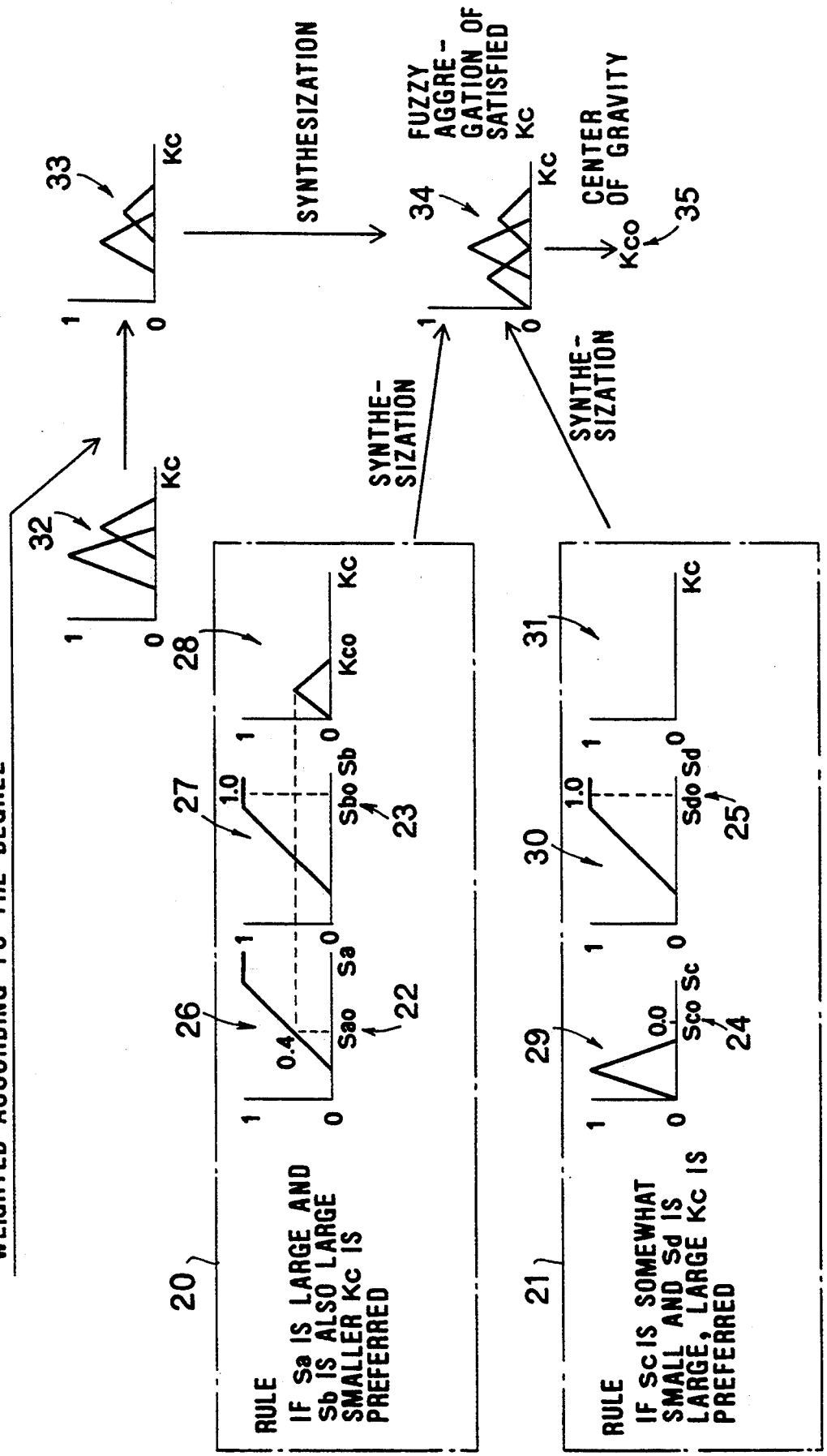
FIG. 7 is an explanatory view showing the operating principle of another embodiment.
Figure 8:
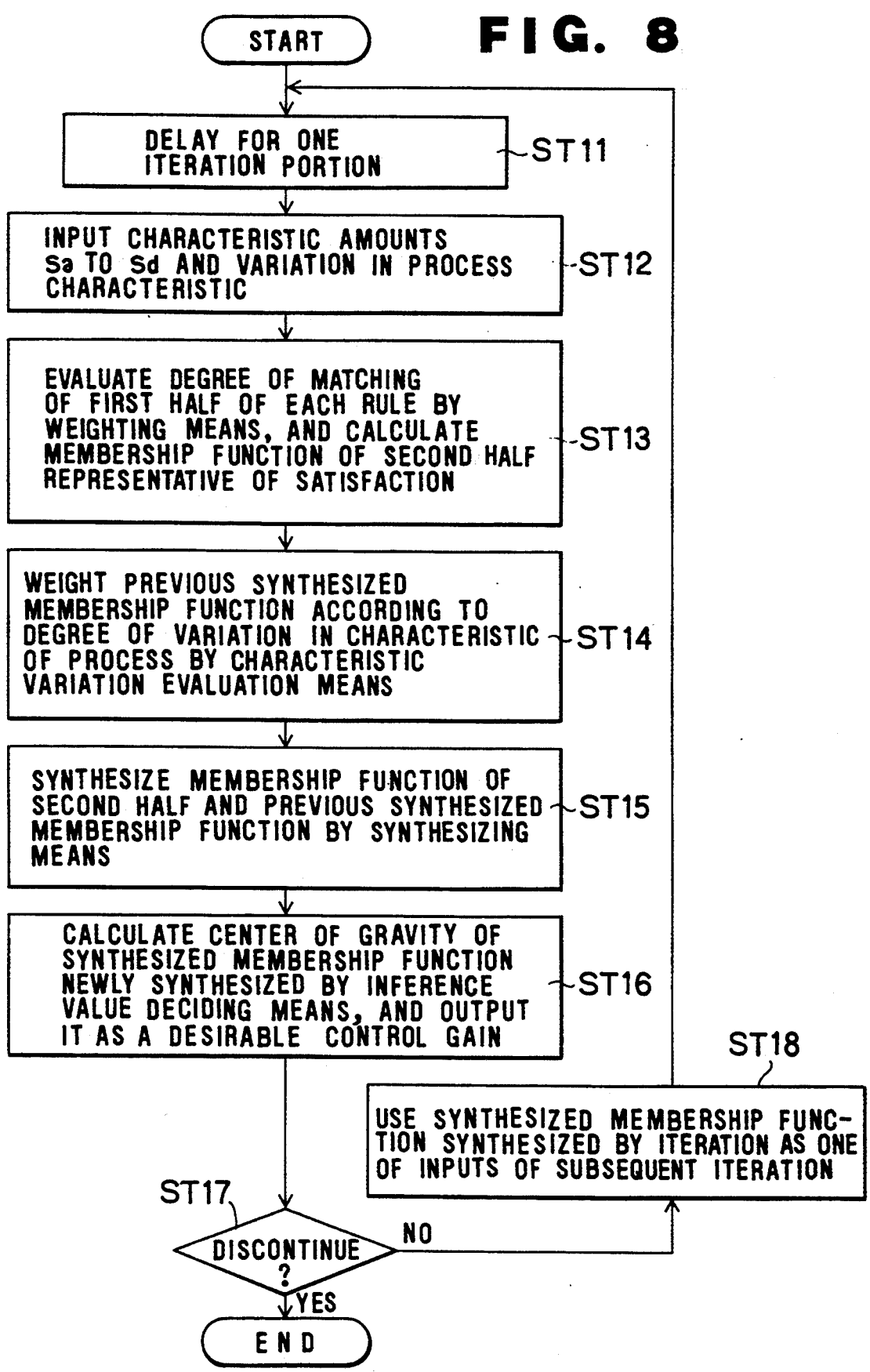
FIG. 8 is a flow chart showing a flow of the operation of the same.

FIG. 7 is an explanatory view showing the operating principle of another embodiment of the present invention, and FIG. 8 is a flow chart for explaining the operation thereof.

In this embodiment, the aforesaid characteristic variables 22 to 25 are specifically shown. That is, the characteristic variable 22 is the divergent trend of an error (e) 42, the characteristic variable 23 is the magnitude Sb of the error 42, the characteristic variable 24 is the following degree Sc of the controlled variable (y) with respect to variation of the reference input (r) 40, and the characteristic variable 25 is the magnitude Sd(=Sb) of the error 42. At this time, the rule 20 has a meaning that "If the divergent trend of the error (e) 42 is large and the absolute value thereof is also large, the control gain Kc is preferably smaller than the present value". Where the actual values of the characteristic variables 22 to 25 inputted into the weighting means 45 are $Sa_o$, $Sb_o$, $Sc_o$ and $Sd_o$, whether or not the value $Sa_o$ is large and whether the value $Sb_o$ is large, in the rule 20, are evaluated by the membership functions 26 and 27, respectively, of the first half of the rule 20. In the example shown in FIG. 7, the respective evaluated values are "0.4" and "1.0", and among these two evaluated values, the lower value "0.4" is employed as the degree of matching of the first half of the rule 20. The second half of the rule 20 defines the fuzzy aggregation of "smaller control gain Kc (=satisfying control gain Kc)" and prepares a membership function 28 with a peak wherein weighting corresponding to the degree of matching "0.4" of the first half is made at a smaller value than the present control gain $Kc_o$. This is totally true for the rule 21. The membership function 31 of the second half is prepared on the basis of the degree of matching wherein the actual values $Sc_o$ and $Sd_o$ of the inputted characteristic variables 24 and 25 are evaluated by the membership functions 29 and 30 of the first half. In this example, the membership function 31 is the function all of whose values are "0".

FIG. 8 is a flow chart showing the flow of the operation as shown in FIG. 7 and in the block diagram of FIG. 3. The synthesized membership function 34, which was synthesized by the synthesizing means 46 in the previous iteration and sent as an input of the subsequent iteration (Step ST 18), is sent to the delay means 48 and given a delay for one iteration portion to obtain a membership function 32 (Step ST 11). Separately from the former, the characteristic variables 22 to 25 are inputted into the weighting means 45 and the process characteristic variation amount 44 from the process 36 is inputted into the characteristic variation evaluation means 49 (Step ST 12). The weighting means 45 prepares the membership functions 28 and 31 by evaluating the inputted characteristic variables 22 to 25 by the membership functions 26, 27 and 29, 30 of the first half of the rules 20 and 21 and on the basis of the obtained degree of matching (Step ST 13). The characteristic variation evaluation means 49 evaluates the degree of variation in characteristic of the process from the process characteristic variation amount 44 inputted, sends its evaluated value to the multiplying means 50, and multiplies the evaluated value by the previous synthesized membership function 32 delayed by the delay means 48 for weighting to obtain the weighted synthesized membership function 33 (Step ST 14).

The membership functions 28 and 31 of the second half of the rules 20 and 21 and the thus weighted synthesized membership function 33 are inputted into and synthesized by the synthesizing means 46 to produce a new synthesized membership function 34 (Step ST 15). For this synthesizing operation, arithmetic operation of the union is used. Accordingly, the synthesized membership function 34 defines the fuzzy aggregation of "satisfying control gain Kc" so far learned by the rules 20 and 21. The synthesized membership function 34 is inputted into the interference value deciding means 47, which in turn decides a control gain $Kc_o$ as the inference value 35 on the basis thereof to output it to the controller 37 from the recurrent type fuzzing inference apparatus 38 (Step ST 16). Specifically, the center of gravity of the synthesized membership function 34 is calculated to decide a representative value $Kc_o$ of a satisfying control gain. Next, judgment for discontinuing the operation is effected (Step ST 17). Where the operation is desired to be continued, processing is returned to Step ST 18, and the synthesized membership function obtained by Step ST 15 is used as an input for the subsequent iteration.

One of the aspects of the present invention which represents an improvement over the prior art is feeding back the previously synthesized membership function and utilizing the previously synthesized membership function as one of the inputs for the next iteration of the synthesis process for a new membership function. In another embodiment representing a still further improvement over the prior art, the previously synthesized membership function, which is fed back from the preceding iteration and used in the synthesis of the new membership function in the next iteration of the synthesis process, is weighted by the characteristic variation evaluation means based on the degree of variation of in the characteristics of the process.

As shown in the flow chart of FIG. 8, for example, the membership function which results from each iteration of the synthesis process is fed back in step ST 18 as one of the inputs for the next subsequent synthesis iteration. Step ST 11 shows the delay of the feedback of the previously synthesized membership function for one iteration of the synthesis process. The weighting of the previously synthesized membership function according to the degree of variation in the process characteristics is shown in Step ST 14.

This mechanization of the feedback of the previously synthesized membership function is shown in FIG. 3 where the synthesized value 34 of each iteration of the synthesis process is fed back through delay means 48 to the synthesizing means 46. The characteristic variation evaluation means 49 provides the weighting function to the delayed feedback signal 32 of the previously synthesized membership function to yield the weighted, previously synthesized membership function feedback signal 33.

The physical hardware for carrying out the disclosed steps is well known and available to those skilled in the art.

As mentioned above, the Mitsubishi MACTUS 210 series marketed by the Mitsubishi Electric Company of Japan as well as the MACTUS 211 series, also sold by Mitsubishi Electric Company, feature PID control functions which are capable of being utilized for performing the functions disclosed herein if properly programmed and configured in accordance with the teachings herein set forth. These control units permit the monitoring of the process control parameters and can be tuned and adjusted and set up with supporting peripheral hardware in a fuzzy logic configuration, all in accordance with the teachings of this invention, whereby those skilled in the art can practice the teachings of the present invention.

For example, the MACTUS 211 series allows interequipment communication between 1-loop controllers and an upper level MACTUS 211 unit, thereby permitting ready systemization in an operating configuration. The MACTUS 210 and 211 series permit tuning in accordance with control rules and have built-in, diversified control functions which can be utilized in practicing the teachings of the present invention as set forth herein.

Figure 9:
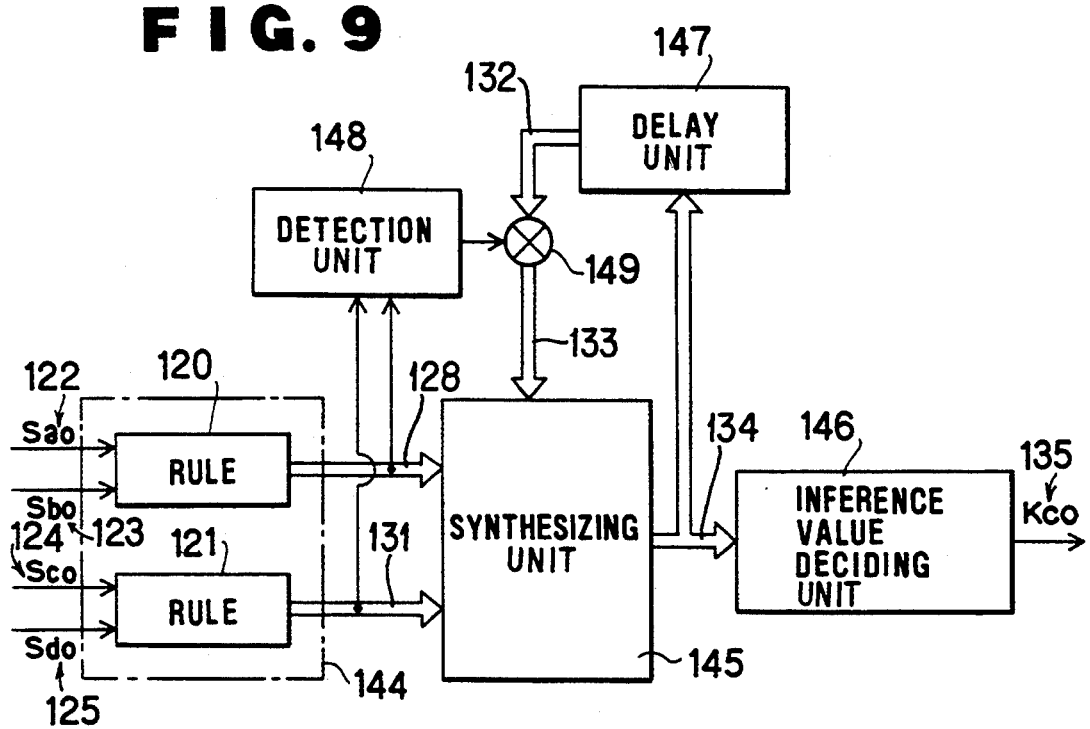
FIG. 9 is a block diagram showing a recurrent type fuzzy inference apparatus according to a further embodiment of the present invention.
Figure 10:
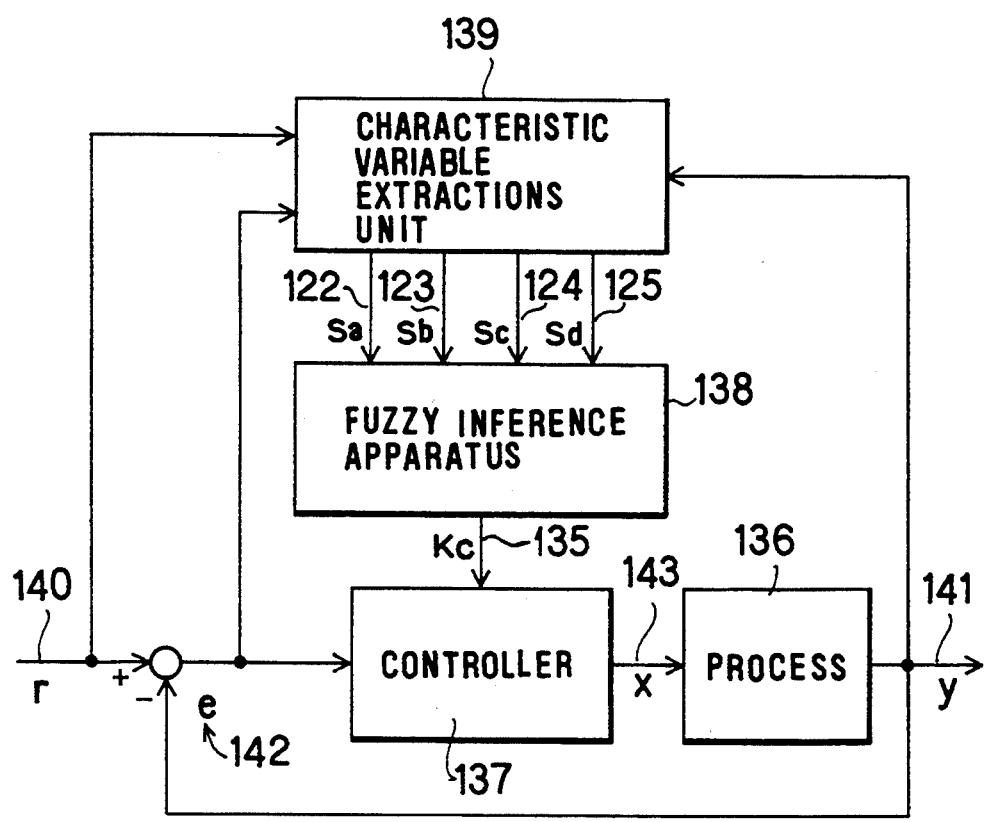
FIG. 10 is a block diagram showing an example in which a controller for controlling the process is applied to a tuning of a control gain.
Figure 11:
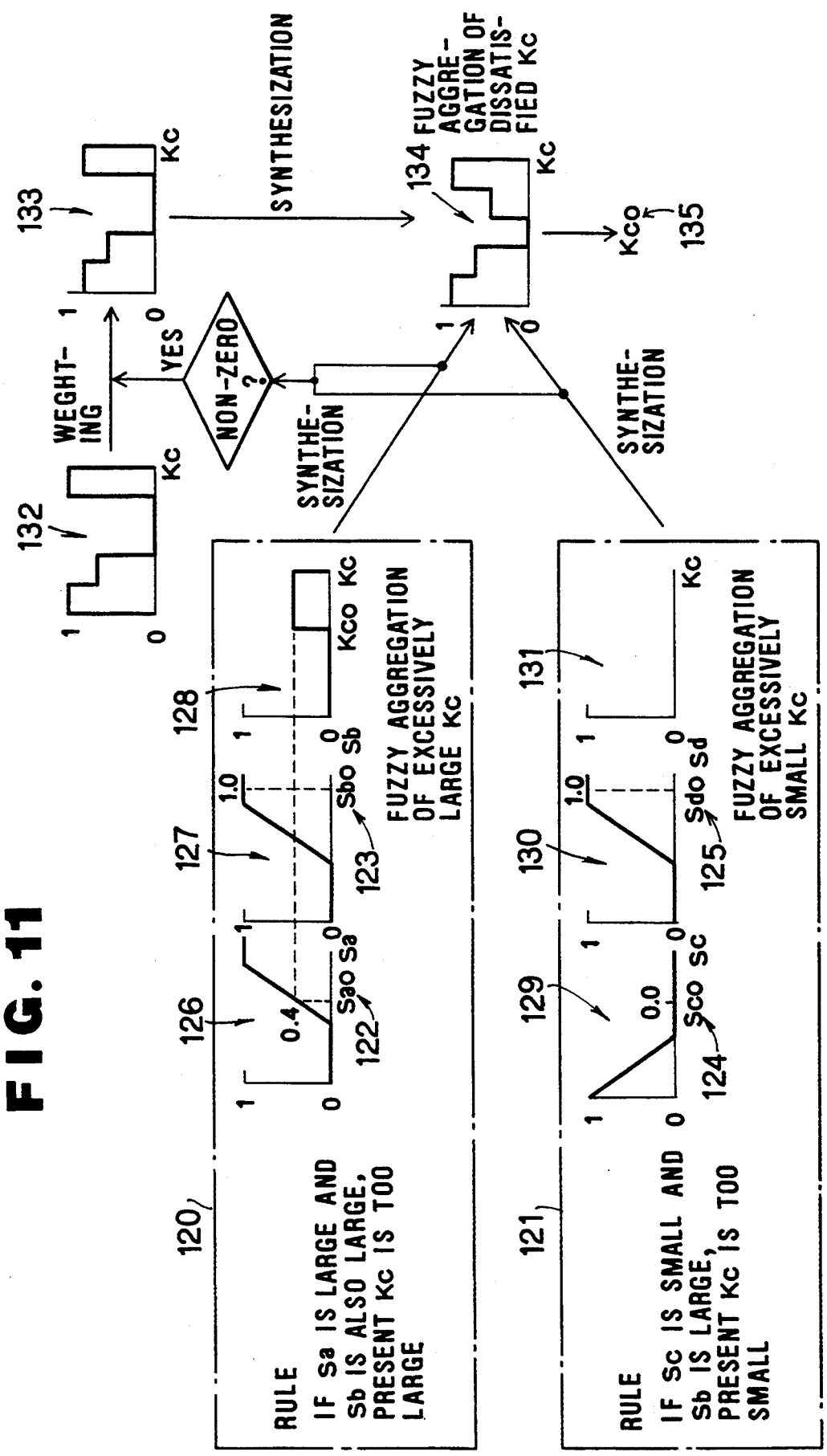
FIG. 11 is an explanatory view showing the operating principle of the same.

A further embodiment of the present invention will be described hereinafter with reference to FIGS. 9 to 12. FIG. 9 is a block diagram showing one embodiment of a recurrent fuzzy inference apparatus according to this invention; FIG. 10 is a block diagram showing an example in which a controller for controlling a process is applied to a tuning of a control gain; and FIG. 11 is an explanatory view showing the operating principle thereof. In these drawings, reference numerals 120 and 121 designate rules for inference, 122 to 125 characteristic variables to be inputted into the recurrent type fuzzy inference apparatus, 126 and 127 membership functions of the first half of the rule 120, 128 a membership function of the second half of the rule 120, 129 and 130 membership functions of the first half of the rule 121, and 131 a membership function of the second half of the rule 121. Reference numeral 132 designates a synthesized membership function representative of a dissatisfaction previously synthesized, 133 a synthesized membership function produced by applying a weighting to the previous synthesized membership function 132 representative of said dissatisfaction where either of membership functions 128 or 131 takes a value larger than "0", 134 a synthesized membership function obtained by synthesizing a membership function 128 of the second half of the rule 120 and a membership function 131 of the second half of the rule 121 and a previous synthesized membership function 133 weighted according to the aforesaid conditions, the membership function 134 being representative of the fuzzy aggregation of "unsatisfactory control gain Kc", and 135 an inference value obtained from the synthesized membership function 134, which in this example, is outputted as a control gain Kc from the recurrent type fuzzy inference apparatus.

Further, as shown in FIG. 10, reference numeral 136 designates a process to be controlled, 137 a controller, for example, such as a PID controller for controlling the process 136, 138 a recurrent type fuzzy inference apparatus according to this invention for supplying an inference value (control gain Kc) 135 to the controller 137, 139 a characteristic variable extraction unit for supplying characteristic variables 122 to 125 to the fuzzy inference apparatus 138, 140 a reference input (r) applied by the outside of the control system, 141 a controlled variable (y) outputted from the process 136, 142 an error (e) between the reference input 140 and the controlled variable 141 inputted into the controller 137, and 143 a manipulated variable (x) applied to the process 136 from the controller 137.

Further, as shown in FIG. 9, reference numeral 144 designates a weighting unit constituting means which evaluates the degree of matching of the first half from the characteristic variables 122 to 125 inputted into the rules 120 and 121 to weight the membership functions of the second half on the basis of the degree of matching, 145 a synthesizing unit constituting means for synthesizing the membership functions 128, 131 weighted by the weighting means 144 and the previous synthesized membership function 133 to obtain a new synthesized membership function 134 representative of the degree of a dissatisfaction of the inference value 135, 146 an inference value deciding unit constituting means for deciding the inference value 135 from the synthesized membership function 134 synthesized by,the synthesizing means 145 to output it, 147 a delay unit constituting means for delaying a new synthesized membership function 132 synthesized by the synthesizing unit constituting means 145, 148 a detection means for detecting whether or not either membership function 128 or 131 of the second half of the rules 120, 121 takes a value larger than "0", and 149 a multiplier constituting means which constitutes detection and weighting means together with the detection means 148 and in which the detection means 148 detects that either of membership functions 128 or 131 takes a value larger than "0", a previous synthesized membership function 132 delayed by the delay means 147 is subjected to a predetermined weighting for use as a synthesized membership function 133, which is fed back to the synthesizing means 145.

Next, the operation will be described. The object of the inference in the recurrent type fuzzy inference apparatus is to effect a tuning of a control gain Kc by monitoring the characteristic variables 122 to 125. So, first, the characteristic variables 122 to 125 are specifically illustrated. That is, the characteristic variable 122 is the divergent trend Sa of the error (e) 142, the characteristic variable 123 the magnitude Sb of the error 142, the characteristic variable 124 the following degree Sc of the controlled variable (y) with respect to a variation of the reference input (r) 140, and the characteristic variable 125 the magnitude Sd (=Sb) of the error 142. At this time, the rule 120 has a meaning that "If the divergent trend of the error (e) 142 is large and the absolute value thereof is also large, the present control gain Kc can be judged to be too large". When the actual values of the characteristic variables 122 to 125 inputted into the weighting means 144 are $Sa_o$, $Sb_o$, $Sc_o$ and $Sd_o$, whether or not the value $Sa_o$ is "large" and whether the value $Sb_o$ is large, in the rule 120, are evaluated by the membership functions 126 and 127 of the first half of the rule 120. In the example shown in FIG. 11, the respective evaluated values are "0.4" and "1.0", are among these two evaluated values, the lower value "0.4" is employed as the degree of matching of the first half of the rule 120.

The second half of the rule 120 defines the fuzzy aggregation of "excessively large control gain Kc", and a control gain $Kc \geq Kc_o$ above the present control gain $Kc_o$ is said to be "excessively large" in the degree of the degree of matching "0.4" of at least the first half. Then, a weighting corresponding to the degree of matching "0.4" of the first half is effected to prepare a membership function 128. This is totally true for the rule 121. The membership function 131 of the second half is prepared on the basis of the degree of matching wherein the actual values $Sc_o$ and $Sd_o$ of the inputted characteristic variables 124 and 125 are evaluated by the membership functions 129 and 130 of the first half. In this example, the membership function 131 is the function in which all the values are "0".

Figure 12:
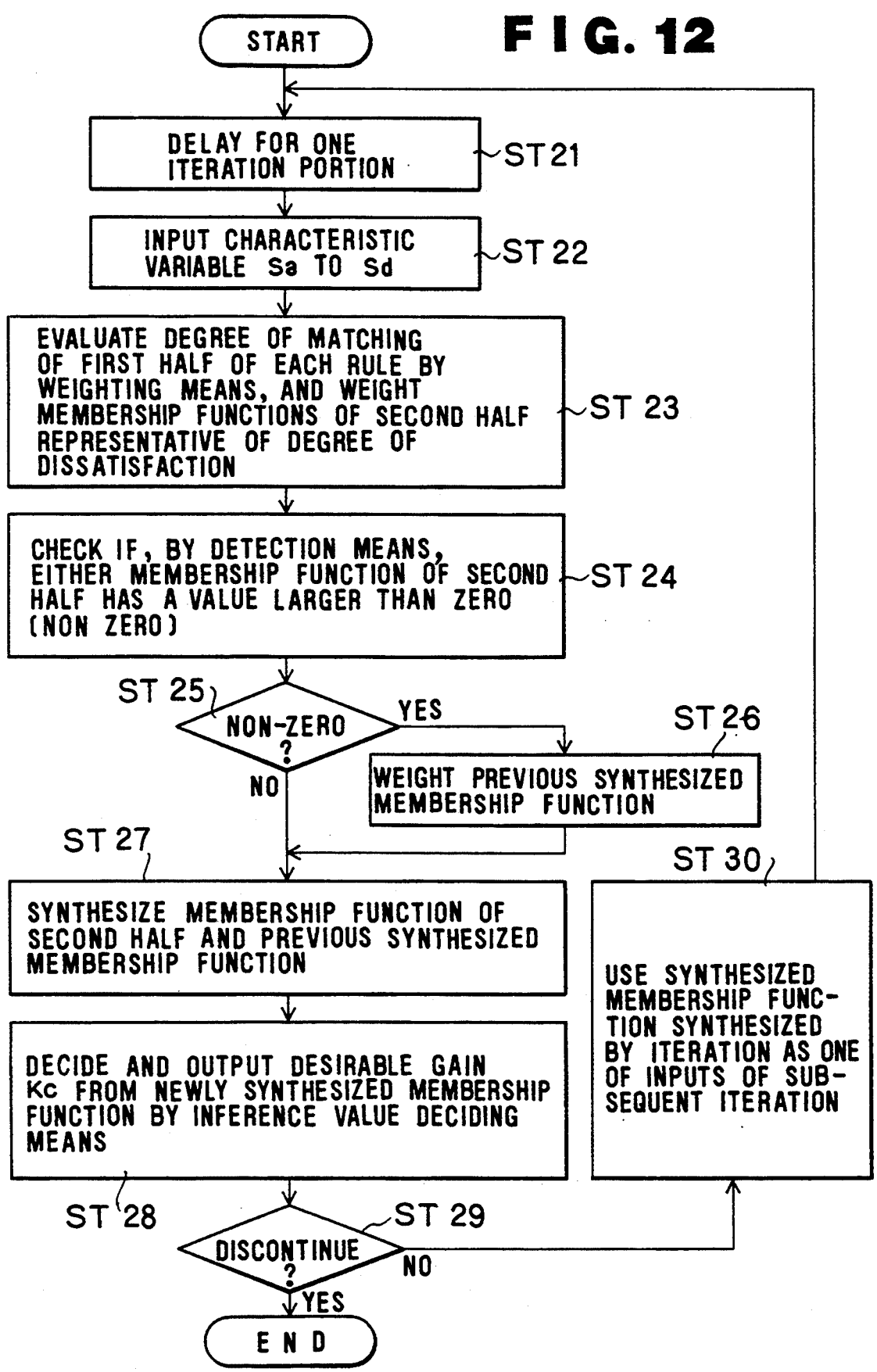
FIG. 12 is a flow chart showing a flow of the operation of the same.
Figure 13:
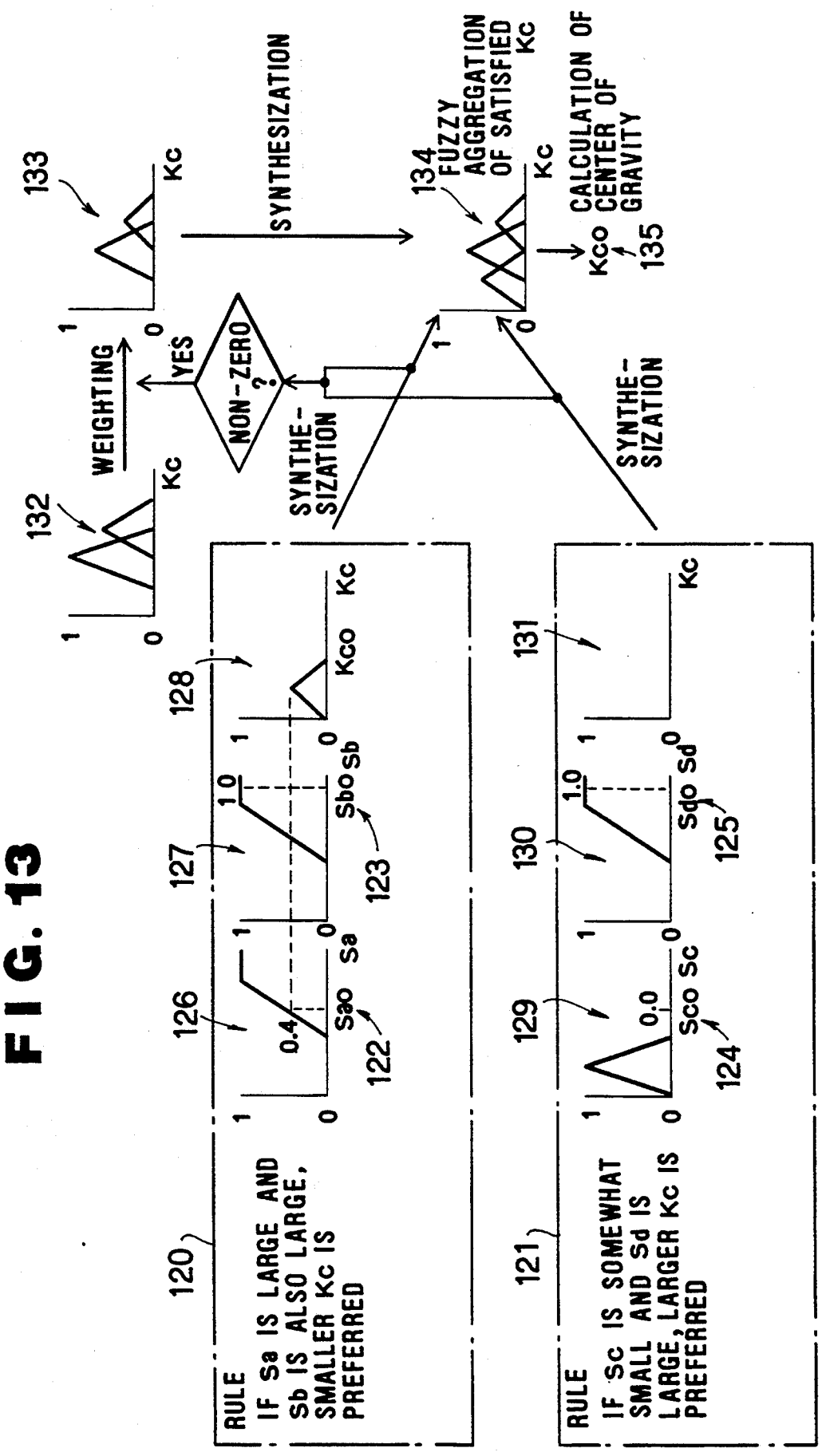
FIG. 13 is an explanatory view showing the operating principle of another embodiment of the present invention.

FIG. 12 is a flow chart showing the flow of the operation. The synthesized membership function 134, which was synthesized by the synthesizing means 145 in the previous iteration and sent as an input of the subsequent iteration (Step ST 30), is sent to the delay means 147 and given a delay for one iteration portion to obtain the membership function 132 (Step ST 21). Separately from the former, the characteristic variables 122 to 125 are inputted into the weighting means 144 (Step ST 22), which in turn prepares the membership functions 128 and 131 of the second half by evaluating the inputted characteristic variables 122 to 125 by the membership functions 126, 127 and 129, 130 of the first half of the rules 120 and 121 and on the basis of the degree of matching (Step ST 23). The detection means 148 detects whether or not either membership function 128 or 131 takes a value larger than "0" (Step ST 24), and requirement of weighting is judged (Step ST 25). In the illustrated example, the rule 120 is excited, and the membership function 128 of the second half takes a value larger than "0". Therefore, in the multiplying means 149, the previous synthesized membership function 132 is subjected to weighting, for example, in 0.9 times, to produce the synthesized membership function 133 (Step ST 26).

The membership functions 128 and 131 of the second half of the rules 120 and 121 and the synthesized membership function 133 weighted as needed are inputted into and synthesized by the synthesizing means 145 to produce a new synthesized membership function 134 (Step ST 27). For this synthesizing operation, the arithmetic operation of the union is used. If all the membership functions 128 and 131 have only the values of "0", the previous synthesized membership function 132 is multiplied by 1.0 by the multiplying means 149 and is inputted as the synthesized membership function 133 into the synthesizing means 145 without being subjected to weighting. Accordingly, the new synthesized membership function 134 obtained by the synthesizing operation of the synthesizing means 145 is the same as the previous membership function 132. As described above, the synthesized membership function 134 represents the fuzzy aggregation of "unsatisfied control gain Kc" so far learned. The thus produced synthesized membership function 134 is inputted into the inference value deciding means 147, which in turn decides the control gain $Kc_o$ as an inference value 135 on the basis thereof to output it to the controller 137 from the recurrent fuzzy inference apparatus 138 (Step ST 28). Specifically, a control gain, wherein the value of the synthesized membership function 134 is the smallest, may be selected. Next, judgment for discontinuing the operation is effected (Step ST 29), and when the operation is desired to be continued, processing is returned to Step ST 30 and the synthesized membership function obtained by Step ST 27 is used as an input for the subsequent iteration.

As described above in connection with FIG. 8, the flow chart of FIG. 12 shows the feedback of the membership function synthesized in each iteration of the synthesis process, with a delay of one iteration step, and the use of this previously synthesized membership function in the next subsequent iteration of a new membership function. The feedback step is shown in Step ST 30 and the delay for one iteration is shown in step 21. As also mentioned above, the previously synthesized membership function, which is fed back for use in the next iteration of the synthesis process, is also weighted as shown in Step ST 26 of FIG. 12.

In the following, another embodiment of the present invention will be described with reference to FIGS. 9, 10, 13 and 14.

First, the characteristic variables 122 to 125 are specifically shown. That is, the characteristic variable 122 is the divergent trend Sa of the error (e) 142, the characteristic variable 123 the magnitude Sb of the error 142, the characteristic variable 124 the following degree Sc of the controlled variable (y) with respect to a variation of the reference input (r) 140, and the characteristic variable 125 the magnitude Sd(=Sb) of the error 142. At this time, the rule 120 has a meaning that "If the divergent trend of the error (e) 142 is large and the absolute value thereof is also large, the control gain Kc is preferably smaller than the present value." Where the actual values of the characteristic variables 122 to 125 inputted into the weighting means 144 are $Sa_o$, $Sb_o$, $Sc_o$ and $Sd_o$, whether or not the value $Sa_o$ is large and whether or not the value $Sb_o$ is large, in the rule 120, are respectively evaluated by the membership functions 126 and 127 of the first half of the rule 120. In the example shown in FIG. 13, the respective evaluated values are "0.4" and "1.0", and among these evaluated values, the lower value, "0.4", is employed as the degree of matching of the first half of the rule 120. The second half of the rule 120 defines the fuzzy aggregation of "smaller control gain Kc (=satisfying control gain Kc)". A membership function 128 with a peak wherein weighting corresponding to the degree of matching "0.4" of the first half is made at a value smaller than the present control gain $Kc_o$ is prepared. This is totally true for the rule 121. The membership function 131 of the second half is prepared by evaluating the actual values $Sc_o$ and $Sd_o$ of the inputted characteristic variables 124 and 125 by the membership functions 129 and 130 of the first half and on the basis of the degree of matching resulting from such evaluation. In this example, the membership function 131 is the function all of whose values are "0".

Figure 14:
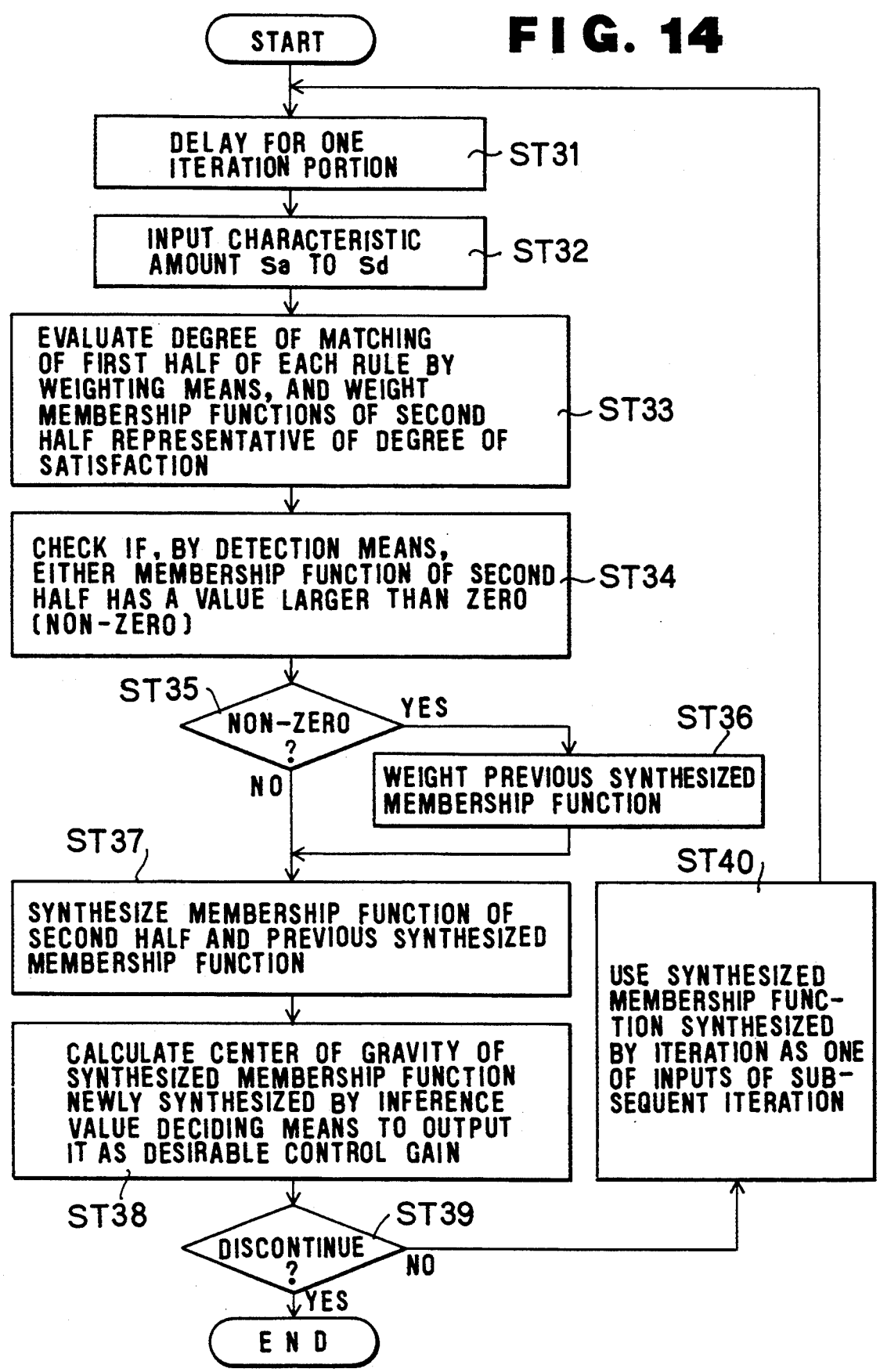
FIG. 14 is a flow chart showing a flow of the operation of the same.

FIG. 14 is a flow chart showing the flow of the operation. The synthesized membership function 134, which was synthesized by the synthesizing means 145 in the previous iteration and sent as an input of the subsequent iteration (Step ST 40), is sent to the delay means 147 and given a delay for one iteration portion to obtain a membership function 132 (Step ST 31). Separately from the former, the characteristic variables 122 to 125 are inputted into the weighting means 144 (Step ST 32), and the weighting means 144 prepares the membership functions 128 and 131 of the second half by evaluating the characteristic variables 122 to 125 inputted by the membership functions 126, 127 and 129, 130 of the first half of the rules 120 and 121 and on the basis of the obtained degree of matching (Step ST 33). The detection means 148 detects whether or not either membership function 128 or 131 takes a value larger than "0" (Step ST 34), and requirement of weighting is judged (Step ST 35). In the illustrated example, the rule 120 is excited and the membership function 128 of the second half takes a value larger than "0". Therefore, the previous synthesized membership function 132 is weighted 0.9 times, for example, in the multiplying means 149 to produce a synthesized membership function 133 (Step ST 36).

The membership functions 128 and 131 of the second half of the rules 120 and 121 and the synthesized membership function 133 weighted as needed are inputted into and synthesized by the synthesizing means 145 to produce a new synthesized membership function 134 (Step ST 37). For this synthesizing operation, arithmetic operation of the union is used. If the membership functions 128 and 131 have only the value of "0", the synthesized membership function 132 is multiplied by 1.0 by the multiplying means 149 and is inputted as the synthesized membership function 133 into the synthesizing means 145 without being subjected to weighting. Accordingly, the new membership function 134 obtained by the synthesizing operation of the synthesizing means 145 is the same as the previous synthesized membership function 132. As described above, the synthesized membership function 134 represents the fuzzy aggregation of "satisfying control Kc" so far learned. The thus produced synthesized membership function 134 is inputted into the inference value deciding means 146, which in turn decides the control gain $Kc_o$ as an inference value 135 on the basis thereof to output it to the controller 137 from the recurrent type fuzzy inference apparatus 138 (Step ST 38). Specifically, the center of gravity of the synthesized membership function 134 is calculated to decide a representative value $Kc_o$ of a satisfying control gain. Next, a judgment for discontinuing the operation is effected (Step ST 39), and when the operation is desired to be continued, processing is returned to Step ST 40 and a synthesized membership function obtained in Step ST 37 is used as an input of the subsequent iteration.

While in the above-described embodiment, an example using two rules of inference has been illustrated, it is to be noted that more than three rules may be used. In addition, the number of inputs and outputs and the number of stages of the conditions in the first half can be suitably set. Furthermore, for a method of obtaining an inference value from a synthesized membership function, an area bi-section method or the like can be used in place of calculation of the center of gravity.

Moreover, while in the above-described embodiment, the case which is applied to a tuning of a control gain in a controller for controlling a process has been described, it is to be noted that it can be applied to an inference of other parameters to achieve effects similar to those attained by the above-described embodiment.

As described above, according to the present invention, a synthesized membership function obtained by a previous synthesizing operation is fed back and/or fed back with weighting according to the conditions, which is reused for synthesization of a present membership function. Therefore, even in the case where the characteristic variable (Si) is normally Si=0 and only when a specific phenomenon should occur, it is $0 < Si \leq 1$, inference is possible. Furthermore, in the case where not only the inference value takes a continuous value but a parameter to be inferred is constant or merely varied slowly, a convergent inference value may be obtained.

What is claimed is:

1. A fuzzy inference apparatus comprising:
   (a) a weighting means for evaluating the degree of matching of characteristic variables and having a plurality of rules formed with a first half and a second half using a membership function of a value between "0" and "1", said weighting means including means for evaluating a degree of matching of said first half from characteristic variables of a process inputted into said rules and for weighting said membership function of said second half according to the degree of matching;
   (b) a synthesizing means for synthesizing a new synthesized membership function at a present time t from (i) a previously synthesized membership function previously synthesized at a past time t-Δt with respect to said present time t and obtained from and fed back from a previous synthesizing operation carried out at said past time t-Δt and (ii) the membership function weighted by said weighting means; and
   (c) an inference value deciding means for deciding an inference value from said new synthesized membership function obtained by said synthesizing means.

2. A fuzzy inference apparatus according to claim 1, wherein said weighting means includes means for weighting said previously synthesized membership function fed back to said synthesizing means according to the degree of variation in a selected process characteristic of said process in response to a manipulated variable derived from a previously synthesized membership function and applied to said process.

3. A fuzzy inference apparatus according to claim 2, wherein said weighting means includes means for determining and providing an output to the effect that said inference value is "excessively large" or "excessively small", and said synthesizing means synthesizes membership functions representative of a dissatisfaction in a sense of "excessively large" or "excessively small".

4. A fuzzy inference apparatus comprising:
   (a) a weighting means for evaluating the degree of matching of characteristic variables and having a plurality of rules formed with a first half and a second half using a membership function of a value between "0" and "1", each rule being described about a degree of satisfaction of each inference value, said weighting means including means for evaluating a degree of matching of said first half from inputted characteristic variables of a process and for weighting the membership function of said second half according to the degree of matching;
   (b) a synthesizing means for feeding back and inputting at a present time t a previously synthesized membership function previously synthesized at past time t-Δt with respect to said present time t and obtained from a previous synthesizing operation carried out at said past time t-Δt and synthesizing a new membership function at said present time t from (i) said previously synthesized membership function and (ii) said membership function weighted as described above;
   (c) an evaluating and weighting means for evaluating and weighting said previously synthesized membership function fed back to said synthesizing means according to the degree of variation in a selected process characteristic of said process in response to a manipulated variable from a previously synthesized membership function and applied to said process; and
   (d) an inference value deciding means for deciding and outputting an inference value from said new synthesized membership function by said synthesizing means.

5. A fuzzy inference apparatus comprising:
   (a) a weighting means for evaluating the degree of matching of characteristic variables and having a plurality of rules formed with a first half and a second half using membership functions of a value between "0" and "1", said weighting means including means for evaluating a degree of matching of said first half from characteristic variables of a process inputted into said rules and for weighting the membership functions of said second half according to the degree of matching;
   (b) a synthesizing means for synthesizing at a present time t a new synthesized membership function from (i) a previously synthesized membership function previously synthesized at a past time t-Δt with respect to said present time t and obtained from a previous synthesizing operation carried out at said past time t-Δt and (ii) the membership functions weighted by said weighting means;
   (c) a detection and weighting means for weighting, as required, the previously synthesized membership function fed back to said synthesizing means when either of said membership functions of said second half of each of said rules takes a value larger than "0"; and
   (d) an inference value deciding means for deciding and outputting an inference value from said new synthesized membership function obtained by said synthesizing means.

6. A fuzzy inference apparatus according to claim 5, wherein said weighting means includes means for determining and providing an output to the effect that said inference value is "excessively large" or "excessively small", and said synthesizing means synthesizes membership functions representative of a dissatisfaction in a sense of "excessively large" or "excessively small".

7. A fuzzy inference apparatus comprising:
   (a) a weighting means for evaluating the degree of matching of characteristic variables and having a plurality of rules formed with a first half and a second half using a membership function of a value between "0" and "1", each rule being described relative to a degree of satisfaction of an inference value, said weighting means including means for evaluating a degree of matching of said first half from inputted characteristic variables of a process and for weighting the membership function of said second half according to the degree of matching;

(b) a synthesizing means for synthesizing at a present time t a new synthesized membership function from (i) a previously synthesized membership function previously synthesized at a past time t-Δt with respect to said present time t and obtained from a previous synthesizing operation carried out at said past time t-Δt and (ii) said membership function weighted by said weighting means;

(c) a detection means for weighting, as required, the previously synthesized membership function fed back to said synthesizing means; and (d) an inference value deciding means for deciding and outputting an inference value from said new synthesized membership function obtained by said synthesizing means.

* * * * *

UNITED STATES PATENT AND TRADEMARK OFFICE
CERTIFICATE OF CORRECTION

PATENT NO. : 5,432,885
DATED : July 11, 1995
INVENTOR(S) : Kohei Nomoto et al.

It is certified that error appears in the above-indentified patent and that said Letters Patent is hereby corrected as shown below:

Col. 2, line 5, "eo" should be -- $e_o$ --; Col. 4, line 39, after "matching" insert a comma; Col. 4, line 49, after "delay" insert -- unit constituting --; Col. 9, line 51, after "detection" insert -- unit constituting --.

Signed and Sealed this

Second Day of January, 1996

Attest:

BRUCE LEHMAN

*Attesting Officer*    *Commissioner of Patents and Trademarks*